H. B. BROOKS.
ELECTRIC TRANSFORMER.
APPLICATION FILED NOV. 1, 1919.
1,357,197.  Patented Oct. 26, 1920.
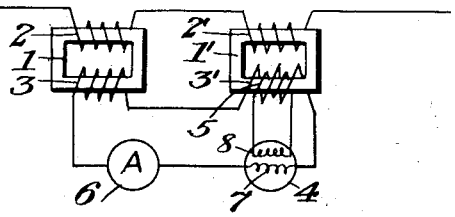
*Fig. 1.*
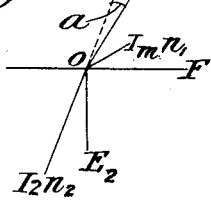 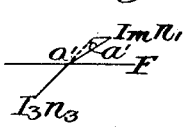 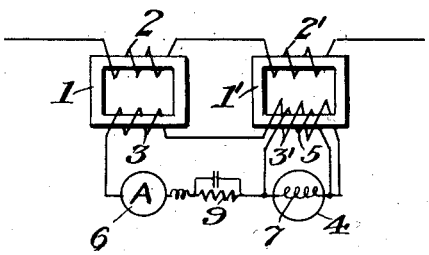
*Fig. 2.*  *Fig. 3.*  *Fig. 4.*
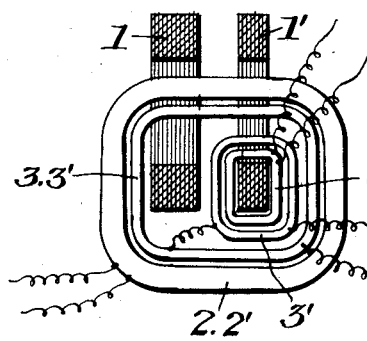 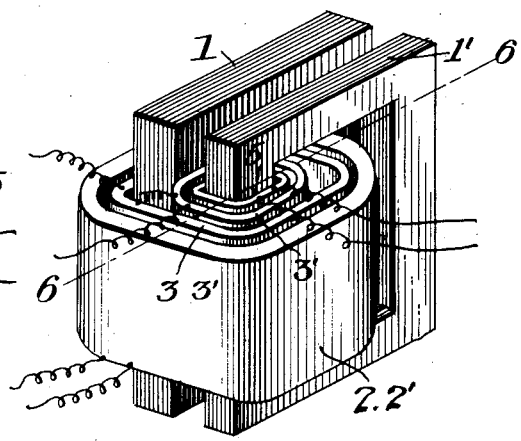
*Fig. 6.*  *Fig. 5.*
Inventor
Herbert B. Brooks
by Chas. J. Neill
Atty.

UNITED STATES PATENT OFFICE.

HERBERT B. BROOKS, OF WASHINGTON, DISTRICT OF COLUMBIA.

ELECTRIC TRANSFORMER.

1,357,197.  Specification of Letters Patent.  Patented Oct. 26, 1920.

Application filed November 1, 1919. Serial No. 334,964.

*To all whom it may concern:*

Be it known that I, HERBERT B. BROOKS, a citizen of the United States, and a resident of Washington, District of Columbia, have invented certain new and useful Improvements in Electric Transformers; and I do hereby declare the following to be a full, clear, and exact description of the invention, such as will enable others skilled in the art to which it appertains to make and use the same.

The invention relates to an electric transformer system which will inherently and automatically effect a correction of the current ratio and the phase angle between the primary and secondary currents to any desired degree of accuracy and within any ordinary variations or changes in the electric circuits or apparatus in which the transformer is employed. The invention is more particularly adapted to current transformers, used for operating electrical measuring instruments, such as ammeters, wattmeters, and watthour meters, as well as relays, trip coils of circuit breakers, etc. The invention, however, is not limited in its application to current transformers but is generally applicable to all transformers where it is desired to control the ratio of the secondary current to the primary current, or the time-phase angle between these currents, or both ratio and time-phase angle. Since the current transformer is one of the commonest pieces of apparatus to which my invention is applicable, and in connection with which it may be readily understood, I shall describe my invention as applied to such a transformer.

The current transformer as ordinarily used for the above mentioned purposes consists essentially of a core of magnetic material, usually of iron or an alloy consisting largely of iron, on which are wound two coils of insulated wire or their electrical equivalent. One of these coils, usually of a few turns of large wire, is connected in the primary or line circuit, which is usually of high voltage, and the other coil, usually of a larger number of turns of smaller wire, supplies a secondary induced current which passes through and operates the electrical measuring instruments and controlling devices connected in the secondary circuit. In current transformers as so constructed, the ratio of the two currents varies with changes of impedance in the secondary circuit, or with changes in the magnitude of the secondary current, or with changes in the electrical frequency of the current, or with combinations of these causes operating jointly. Also, the electrical phase difference between the primary current and the secondary current, which would be exactly 180 degrees in an ideal transformer, departs from 180 degrees by a small angle, the "phase angle," which varies with each of the above three causes mentioned as affecting the ratio of the currents. For the accurate operation of electrical measuring instruments, especially wattmeters and watthour meters, it is necessary that the ratio and the phase angle be very nearly constant for all operating conditions of secondary impedance, secondary current, and frequency, and that the phase angle should be quite small to avoid errors in measuring loads of low power factor. It is very desirable also that the ratio of the secondary current to the primary current should not only be constant under these circumstances, but should be very close to some definite fraction such as 1/10, 1/50, 1/100, or the like. These two objects are only imperfectly attained by the ordinary current transformer even when it is constructed of the best materials and of good design. The reason for this imperfection is that the component of the primary current which is necessarily used to magnetize the core is the thing which causes the phase angle to depart from 180 degrees and the current ratio to depart from the inverse ratio of the turns in the corresponding windings, and since this component of current varies with the frequency, the secondary impedance, and other operating conditions, the ratio and phase angle must vary also. I am aware that means have been employed for bringing the two currents into the desired 180-degree relation, but these will effect the desired result only when manually adjusted to meet the conditions at the moment, and will in general cease to effect the desired result as soon as one or more of the conditions change. Furthermore, the means employed are such that the ratio of the currents is affected by them. I propose to provide means which shall automatically tend to maintain a constant and correct ratio of currents and to minimize the "phase angle."

In accordance with my invention, I effect the transformation in a manner which may be called a "multi-stage" transformation, in which one transformer is used to effect the transformation in the ordinary way, yielding a secondary current which is approximately correct as to magnitude and phase angle. I then pass the primary current and this secondary current through two windings on a second current transformer, these windings having a ratio of secondary turns to primary turns exactly equal to the desired ratio of primary current to secondary current, and the two currents being sent through their respective windings in such a way that their magnetizing effects upon the core (usually expressed in ampere-turns) tend to oppose each other. This exact ratio of turns is in contrast to the fact that, in current transformers as now constructed, in order to secure approximately the desired ratio, one or more turns of the secondary winding must be omitted from the number which would be required by an ideal transformer. I further provide this second transformer with an auxiliary secondary winding, of the same (or approximately the same) number of turns as the principal secondary winding. It will be evident that if the first transformer is operating under conditions such that the secondary current happens to be exactly correct in magnitude and phase, the ampere-turns of the two windings on the second transformer will annul each other at every moment, and will exert no resultant magnetizing action upon the core of the second transformer, and there will be no magnetic flux set up in the core of the second transformer, and hence no electromotive force will be induced in the auxiliary secondary winding, which winding will thus send no current through an external circuit connected to it.

If, however, as is usually the case in practice, the secondary current produced by the first transformer deviates from the desired ideal value in magnitude, or in phase, or in both magnitude and phase, this current and the primary current, flowing in opposite directions through their respective windings on the second transformer, produce a magnetizing force which sets up a flux in the core. If now the auxiliary secondary winding be connected through an external circuit, a current will flow through this circuit which will tend to reduce the flux in the core of the second transformer to zero. This auxiliary secondary current closely approximates, in magnitude and phase, to the current which must be vectorially added to the secondary current produced by the first transformer in order to give a resultant current having the desired exact ratio to the primary current and the desired 180-degree phase relation to the primary current. In other words, in the second transformer the primary winding and the secondary winding, opposing each other magnetically, may be thought of together as an effective primary winding, and the auxiliary secondary winding plays the part of a secondary winding in the ordinary current transformer, but it delivers a close approximation to the current which must be added to the secondary current produced by the first transformer in order to get a combined current which approximates much more closely to the desired ideal value of secondary current. In other words, the first transformer, by proper design, may be made to give a secondary current which is as near the desired value as is now given in practice by current transformers of equally good design and materials, and the second transformer will then supply an auxiliary secondary current which may be combined with the first secondary current so as to nearly bridge the gap between the latter and the desired ideal current. It will be apparent that if by change of frequency, or of primary current, or of secondary impedance, or any other cause, such as "ageing" or magnetic deterioration of the core of the first transformer, or accidental change in the number of turns in its windings, the secondary current generated by the first transformer departs still farther from the desired value in magnitude and phase, the resultant ampere-turns of the primary winding and the principal secondary winding in the second transformer will increase, and thus increase the current in the auxiliary secondary circuit to correspond. The action is thus automatic, and the effective ratio is held closely to the ideal value as structurally determined by the ratio of turns in the primary winding and the principal secondary winding of the second transformer, and the effective phase angle is held to a minimum which is not only lower than in usual current transformers, but which is more nearly constant with changes of secondary current, secondary impedance, and frequency. In the preceding statements the terms "effective ratio" and "effective phase angle" are based upon the use of the vector sum of the secondary current as generated in the secondary winding of the first transformer and the auxiliary secondary current as generated in the auxiliary secondary winding of the second transformer. There are various ways of uniting these two currents in order to utilize them jointly, and these and other features of my invention may be further explained by means of the accompanying drawings in which:—

Figure 1 is a diagrammatic view of a transformer involving the present invention.

Fig. 2 is a vector diagram of an ordinary current transformer.

Fig. 3 is a vector diagram of the action of an auxiliary transformer used in the invention.

Fig. 4 is a modified arrangement of the electrical apparatus shown in Fig. 1.

Fig. 5 is a perspective view of the arrangement of the transformers embodying one form of the invention.

Fig. 6 is a horizontal section on line 6—6 of Fig. 5.

Referring to Fig. 1 in the drawing, 1 indicates the laminated core of an ordinary current transformer upon which are wound a primary coil 2 and a secondary coil 3. 1' indicates the core of a second or auxiliary transformer provided with a primary winding 2' in series with the primary 2 of the main or "first-stage" transformer and a secondary 3' in series with the secondary 3 of the principal transformer. The parts 1', 2', 3' constitute the second or auxiliary transformer, which in general may be of much smaller size than the principal or "first-stage" transformer. Whereas in the principal transformer the number of turns in the winding 3, may properly be slightly less than the number required by an ideal transformer having an iron core requiring no power to magnetize it, the ratio of turns in coil 3' to those in coil 2' preferably should be the desired ratio of the primary current to the secondary current. On the core 1' of the auxiliary transformer is also wound an auxiliary secondary winding 5, which will usually have the same number, or nearly the same number, of turns as the principal secondary winding 3'. I will now demonstrate that this auxiliary secondary winding, if closed upon itself or through a suitable conducting circuit, will be traversed by a current which is very closely equal to the current which must be combined with the secondary current as produced in coil 3 of the first-stage transformer Fig. 1, in order to give the desired ideal value of secondary current, both as to magnitude and phase.

Fig. 2 is a vector diagram of an ordinary current transformer, in which O—F and O—$E_2$ represent respectively the direction of the magnetic flux in the core 1 and the electromotive force induced in the secondary winding 3. The magnitudes of these two quantities are immaterial for the present discussion. Assuming the usual case of a secondary circuit having resistance and inductive reactance, the line O—$I_2 n_2$ will represent in magnitude and phase the magnetizing force in ampere-turns due to the current $I_2$ flowing through the coil 3 having $n_2$ turns. An exciting current $I_m$ flowing through the $n_1$ turns of the primary winding 2 is required to maintain the flux F. If we add vectorially the exciting ampere-turns O—$I_m n_1$, to the reversed secondary ampere-turns O—A, as is done graphically by drawing the dotted line A—$I_1 n_1$ parallel and equal to O—$I_m n_1$, the line O—$I_1 n_1$ represents the primary ampere-turns. The line O—A represents the component of the primary ampere-turns which balances the secondary ampere-turns O—$I_2 n_2$. If the ratio of the turns, $n_2:n_1$, is made exactly equal to the desired ratio of primary current $I_1$ to the secondary current $I_2$, it will be seen that since O—A is shorter than O—$I_1 n_1$, $I_2$ will be smaller than the desired value. This is usually corrected, for any given set of conditions, by making $n_2$ slightly less than the number required in an ideal transformer. However, for any other set of conditions, the current $I_m$ will in general not change in such proportion to the other currents as to keep the ratio at the desired value. Also, it will be noted that the reversed secondary ampere-turns O—A are displaced from the desired coincidence with the primary ampere-turns O—$I_1 n_1$ by the angle $a$. This latter difficulty cannot be met by dropping turns, and while means have been disclosed for obviating it, such as winding on a third coil which is closed through an adjustable load having such resistance and reactance values as will effect the desired result, such compensation is effective only for one set of conditions, and must be readjusted when conditions change. If we assume for simplicity $n_1 = n_2 = 1$, that is, only one turn on the primary winding 2 and one on the secondary winding 3, it will be seen that the reversed secondary current, instead of having the same magnitude and direction as the primary O—$I_1 n_1$, has the smaller magnitude and different position O—A. It is further evident that if in some way we could vectorially add to the current O—$I_2$ a current represented in magnitude and direction by the line $I_1 n_1$—A, we should have the desired result. By passing the currents $I_1$ and $I_2$ through $n_1$ and $n_2$ turns respectively in the second or auxiliary transformer, we get the state of things shown vectorially in the diagram Fig. 3, in which the vector O'—F is a repetition of O—F in Fig. 2 and is intended only to coördinate the vector relations between the two diagrams Fig. 2 and Fig. 3. Referring to Fig. 3 the effect of the two opposing currents is a magnetizing force $I_m n_1$, and by the same reasoning as in the case of Fig. 2 we shall get, in a third or auxiliary secondary circuit, a current which produces the magnetizing force O—$I_3 n_3$, where $n_3$ is the number of turns in the auxiliary secondary winding. If we choose $n_3$ equal to $n_2$, we shall get in the auxiliary secondary circuit the current $I_3$, which is nearly equal to the desired current $I_m$ which if combined vectorially with the approximately correct secondary current $I_2$ produced in the "first-stage" transformation will give the exact secondary current desired, both in magnitude and phase. The action in the second transformer, which may be called the "second-stage" transformation, is thus to generate a corrective current which will almost exactly correct the first-stage secondary current for its errors of magnitude and direction. It may be readily seen that the expedient of leaving off a few turns may be used in the case of the auxiliary secondary winding in order to make the current $O'—I_s$ equal in magnitude to $O'—I_m$, and that suitable means, such as extra reactance in the auxiliary secondary circuit, may be used to reduce the angle $a'$ to zero. It should be noted that in my invention these expedients are applied to affect only the small corrective current, not the main secondary current as in present practice, and therefore any slight failure of these devices to meet the conditions affects only a small percentage of the result, instead of the whole result as in the present method.

While I have shown and described only two stages, it is evident that a "third-stage" transformer could be used to generate a very small current which would be a "correction to a correction," and that as many stages could thus be used as desired. While I do not limit the application of my invention to two stages, I consider that with proper design and materials the two stages will give a result amply accurate for all usual requirements.

There are various ways of combining the principal secondary current and the auxiliary secondary current so as to secure the effect of a resultant current equal to their vector sum. One of these, which gives very good results, is shown in Fig. 1. The instrument or device 4 in the secondary circuit is wound with two current windings; a principal winding 7, carrying the principal secondary current, and an auxiliary winding 8 carrying the auxiliary secondary current. These two windings are so placed on the cores of the instrument or device that a given current, say 1 ampere, produces the same effect when flowing through either 7 or 8. Thus when the two secondary currents flow through the two windings 7 and 8, they produce the same effect as a current equal to their vector sum flowing through a single winding. This method has the advantage of definiteness, as the desired result is obtained without any special adjustments provided the numbers of turns in windings 2', 3' and 5 are correct. Its disadvantage in practice is that it requires receiving devices with double windings. However, this is not of consequence when accuracy is essential, and furthermore, the auxiliary winding may be of relatively small wire and thus occupy little space. In the principal secondary circuit may be connected any devices of ordinary construction, such as the ammeter 6, Fig. 1, which do not need to give high accuracy and which may have the usual simple winding.

When it is desired to avoid the use of a double current winding in the instruments, the method shown in Fig. 4 may be used. In this case the auxiliary winding 5 is connected to the terminals of the current winding 7 of the instrument 4, and the auxiliary secondary current thus superposes itself upon the principal secondary current. The superposition of currents through the single winding 7 in Fig. 4 is affected somewhat by the amount and nature of the impedance of the other parts of the principal secondary circuit, including the instrument 6 and the impedance 9. In some cases it may be desirable to use such an added impedance 9 in order to make the superposition of currents in the winding 7 more perfect. This method of superposition requires more attention to details than the method shown in Fig. 1, and while the former has some advantages, I prefer the method of Fig. 1 where the highest accuracy is a prime essential.

I do not limit myself to the two methods of superposition above shown, for other methods will readily be devised by those skilled in the art. For example, in Fig. 1 the two windings 7 and 8, instead of being superposed on one core, may be wound on similar cores which mutually coact with other parts to perform the function of the instrument. Neither is my invention limited to the construction of new transformers having transformation in two or more stages, for by supplying the second-stage transformer to coöperate with an existing current transformer of the usual form, the combination will effect the purposes of my invention, since one element of my invention is a current transformer of usual form.

While I have shown the two transformers as separate structures, it is possible to unite them in one physical structure in order to save material, especially copper in the windings. One manner of accomplishing this result is shown in Figs. 5 and 6. Fig. 6 is a section through the cores and windings of the transformer structure shown in perspective in Fig. 5. It will be seen from Figs. 1 and 4 that the primary current must pass around the core 1 and the core 1', and similarly the principal secondary current must pass around both cores, while the auxiliary secondary current must pass around only the core 1'. We may, therefore, wind the auxiliary secondary winding 5 around the core 1', also a few turns of the principal secondary winding 3', equal to the number by which the number of turns in winding 3 is less than the number for an ideal perfect transformer, and we may then place the core 1', so wound, alongside of core 1, and then wind around the two cores the principal secondary winding, of a number of turns equal to those used in winding 3 in Fig. 1, and then over this the primary winding. For simplicity I have not shown in Figs. 5 and 6 the connections between the transformers and the devices which they are to operate.

While I have shown, in Figs. 1 and 4, cores 1 and 1' of the same size, and primary windings 2 and 2' of the same number of turns, it is evident that the transformer which supplies the auxiliary or corrective secondary current has a very much smaller electrical output than the principal transformer, and may therefore have a smaller iron core and a proportionately smaller number of turns in all the windings. I have indicated in Figs. 5 and 6 that the core 1' may have a smaller cross section of iron than the core 1.

It is evident that modifications may be made in the structures illustrated, and I desire that variations which do not depart from the spirit of my invention shall be included within its scope. It is also evident that applications of my invention may be made other than the ones selected for illustration.

What I claim is:

1. An electric transforming device comprising means for producing a secondary current having approximately a desired ratio and phase relation to the primary current, means for generating an auxiliary corrective current inherently variable in accordance with the ratio and phase relation of the primary and secondary currents, and means for combining the effects of the secondary current and the auxiliary corrective current to produce the effect of a secondary current having substantially the desired ratio and phase relation to the primary current.

2. An electric transformer having a magnetizable core, a primary winding and a secondary winding thereon, an auxiliary magnetizable core having a primary winding, a principal secondary winding, and an auxiliary seconding winding adapted to produce a corrective current inherently variable in accordance with the ratio and phase relation of the primary and secondary currents, which corrective current when combined in substance or in effect with the current in the principal secondary winding produces the effect of a secondary current having substantially the desired ratio and phase relation to the primary current.

3. A current transformer having a principal magnetizable core, a primary winding and a secondary winding thereon, an auxiliary magnetizable core, a primary winding, a principal secondary winding, and an auxiliary secondary winding thereon, the said primary windings being connected in series with each other and in the line in which a primary current is flowing, the said secondary winding of the principal core being connected in series with the principal secondary winding of the auxiliary core so that the magnetic effects of the currents in the primary winding and the principal secondary winding of the auxiliary core tend to balance each other, and the auxiliary secondary winding having induced in it an auxiliary secondary current which when combined vectorially with the principal secondary current will equal some desired fraction of the primary current in magnitude and phase more accurately than does the principal secondary current alone.

4. A current transformer including a principal magnetic circuit, primary and secondary windings thereon having a turn-ratio approximately equal to a desired current ratio, an auxiliary magnetic circuit having primary and secondary windings whose turn-ratio is exactly equal to the desired current ratio, the said auxiliary magnetic circuit having also an auxiliary secondary winding whose turn-ratio with respect to the primary winding is approximately or exactly equal to the desired current ratio, the interconnections of the windings being such as to generate in the auxiliary secondary winding a corrective current inherently variable in accordance with the ratio and phase relation of the primary and principal secondary currents, whereby upon combination of the corrective current and the principal secondary current or of their effects a closer approach is obtained to the desired current ratio and phase relation, in substance or in effect.

5. A current transformer having a principal core with primary and secondary windings so proportioned as to give an approximate ratio and phase relation of the primary and secondary currents, in combination with an auxiliary core having primary, secondary, and auxiliary secondary windings, said windings being so arranged that the auxiliary secondary winding delivers a corrective current inherently variable in accordance with the ratio and phase relation of the primary and secondary currents, so that the said corrective current when combined with the secondary current delivered by the secondary winding of the principal core will give a resultant current having the desired ratio and phase relation with respect to the primary current.

6. In combination, a principal magnetic circuit, an auxiliary magnetic circuit having a portion of a principal secondary winding and also an auxiliary secondary winding linked therewith, and a single primary winding and the remainder of the principal secondary winding linking with both of the magnetic circuits, substantially as described.

7. In combination, a principal magnetic circuit, an auxiliary magnetic circuit having a secondary winding linked therewith of the number of turns by which the secondary winding of the principal magnetic circuit should fall short of the theoretical number for a perfect transformer having the desired ratio and phase relation, the said auxiliary magnetic circuit having also linked therewith an auxiliary secondary winding approximately or exactly equal to said theoretical number of turns, in combination with a single primary winding and the remainder of the principal secondary winding linking with both of the magnetic circuits, substantially as described.

8. In an electric transforming device, a principal magnetic circuit, primary and secondary windings thereon, one or more auxiliary magnetic circuits each having a primary winding, a principal secondary winding, and an auxiliary secondary winding, the turn-ratios and interconnections of the windings being such that the auxiliary secondary currents are caused to vary inherently in accordance with the ratio and phase relation of the primary and secondary currents, and are combined, in substance or in effect, with the principal secondary current, whereby the principal secondary current will be brought more and more closely, in substance or in effect, to a constant ratio and phase relation to the primary current.

In testimony whereof I affix my signature, in presence of two witnesses.

HERBERT B. BROOKS.

Witnesses:
PAUL M. SALSBURG.
MILTON REINBERGER.